United States Patent [19]

Forhaltz et al.

[11] 4,138,899

[45] Feb. 13, 1979

[54] GEAR AND BOSS PROTECTOR

[75] Inventors: Howard A. Forhaltz, Lanesborough, Mass.; Kenneth H. Sickler, Simsbury, Conn.

[73] Assignee: General Electric Company

[21] Appl. No.: 820,590

[22] Filed: Aug. 1, 1977

[51] Int. Cl.[2] .............................................. F16H 21/44

[52] U.S. Cl. .............................. 74/100 R; 200/11 TC

[58] Field of Search ............................ 200/11 TC, 62; 74/100 R, 100 P, 101, 100

[56] References Cited

U.S. PATENT DOCUMENTS

| | | | |
|---|---|---|---|
| 2,009,383 | 7/1935 | Blume | 200/11 TC |
| 2,200,990 | 5/1940 | Lennoy et al. | 200/11 TC |
| 2,878,333 | 3/1959 | McCarty et al. | 200/11 TC |

*Primary Examiner*—Benjamin W. Wyche
*Assistant Examiner*—Wesley S. Ratliff, Jr.
*Attorney, Agent, or Firm*—Francis X. Doyle

[57] ABSTRACT

A gear and boss protector for the spring driving mechanism of a tap selector such as a voltage regulator. A pair of hook cams form the protective means and they are mounted rotatably on the crank driven by the spring driving gear. One of the hook cams engages the driving boss on the driving gear should the gear reverse rotation in one direction, while the other hook cam engages the driving boss on the driving gear should the gear reverse rotation in the opposite direction. The engagement of the driving boss by the hook cam prevents the crank from being suddenly released causing damage to the gear or boss.

2 Claims, 3 Drawing Figures

GEAR AND BOSS PROTECTOR

BACKGROUND OF THE INVENTION

This invention relates to spring-driven tap changers, and more particularly, to a protective means for the driving gear and boss of such spring-driven changer.

As is well known to those skilled in the tap changer art, many tap changer mechanisms utilize a spring drive to provide a rapid, snap-opening of contacts to prevent arcing damage to such contacts. One such mechanism is shown in U.S. Pat. No. 2,878,333 issued in the names of O. P. McCarty and J. R. Barr and assigned to the same assignee as this invention. One problem with such mechanism is the possibility of breakage of either the driving boss or the driving gear when the tap changer signal is removed before the spring begins the tap change, but after it has been cranked, or loaded, near to the dead center position. In that position, the drive gear could reverse and the spring suddenly be released. If this should occur, the crank could strike the boss, breaking it or the drive gear on which it is mounted.

It has been discovered that a protective means to prevent such damage may be provided to the driving gear and boss of the spring-actuated tap changer. In one embodiment, the protective means may take the form of a pair of hook cams which are pivotally mounted on the crank, the hook cams engaging the boss should the boss attempt reverse rotation, prior to the actuation of the tap change. The protective means prevent the release of the crank into sudden engagement with the boss, which could damage either the boss or the driving gear.

It is, therefore, a principal object of this invention to provide a protective means for the driving gear and boss of a spring-driven tap changer.

A further object of this invention is to provide a hook device on the crank of a spring-driven tap changer to engage the driving boss in a reverse rotation to prevent release of the crank in a manner as would strike the boss to cause damage thereto.

SUMMARY OF THE INVENTION

Briefly, in one form, this invention comprises a spring-driven tap changer having a protective means, preferably in the form of a pair of hook cams, rotatably mounted on the spring crank. If, after the beginning of a tap change when the spring crank has been driven to substantially the top of its load position, should the driving boss reverse its rotation it will move the protective means, such as one of the hook cams, into engagement with the boss thereby preventing the spring-driven crank from suddenly releasing and engaging the boss thereby damaging either the boss or the driving gear.

The invention which is sought to be protected will be particularly pointed out and distinctly claimed in the claims which are appended hereto. However, it is believed that this invention and the manner in which its various objects and advantages are obtained, as well as other objects and advantages thereof, will be better understood by reference to the following detailed description of the present preferred embodiment, particularly when considered in connection with the accompanying drawing.

DESCRIPTION OF PREFERRED EMBODIMENT

Figure 3:
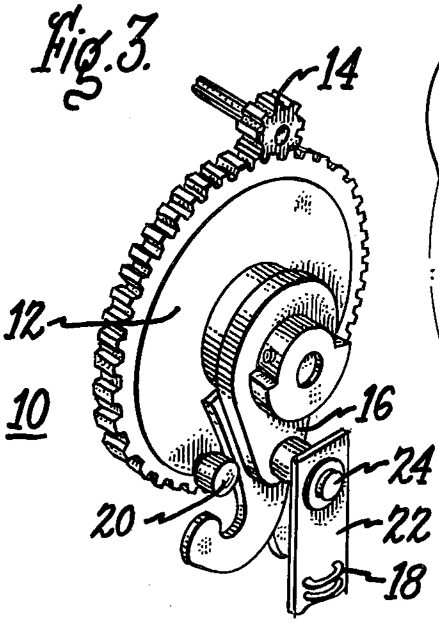
FIG. 3 is a perspective view of a portion of a tap changer showing the driving gear assembly of a spring-driven tap changer with the protective means of this invention attached thereto.

The present preferred embodiment will be described with reference to the tap changer and protective means shown in the drawing. However, it will be understood that the protective means of this invention can take a plurality of forms, and that it may be applied to any desired tap changer having spring actuation. Referring now to the drawing, in which like numerals are used to indicate like parts throughout the various views, FIG. 3 show a perspective view of a portion of a spring-driven tap changer 10, operating in a manner similar to that disclosed in U.S. Pat. No. 2,878,333. As will be understood, the driving gear 12 is driven through pinion 14 by means of a gear train and motor (not shown). The motor and gear train are actuated by conventional means (not shown) in response to the detection of the need for a tap change. As will be understood, driving gear 12, is driven in either direction, depending on the required tap change. Driving gear 12 drives crank 16, which includes spring 18, through the boss 20. As can be seen, spring 18 has one end fixed to bar 22, which is pivoted to the crank 16 by pin 24. The other end of spring 18 is attached to a fixed point (not shown). Generally, boss 20 engages crank 16 and rotates the crank 16, to load spring 18 for the desired tap change. Since this operation is well understood, it will not be further described or discussed.

Figure 1:
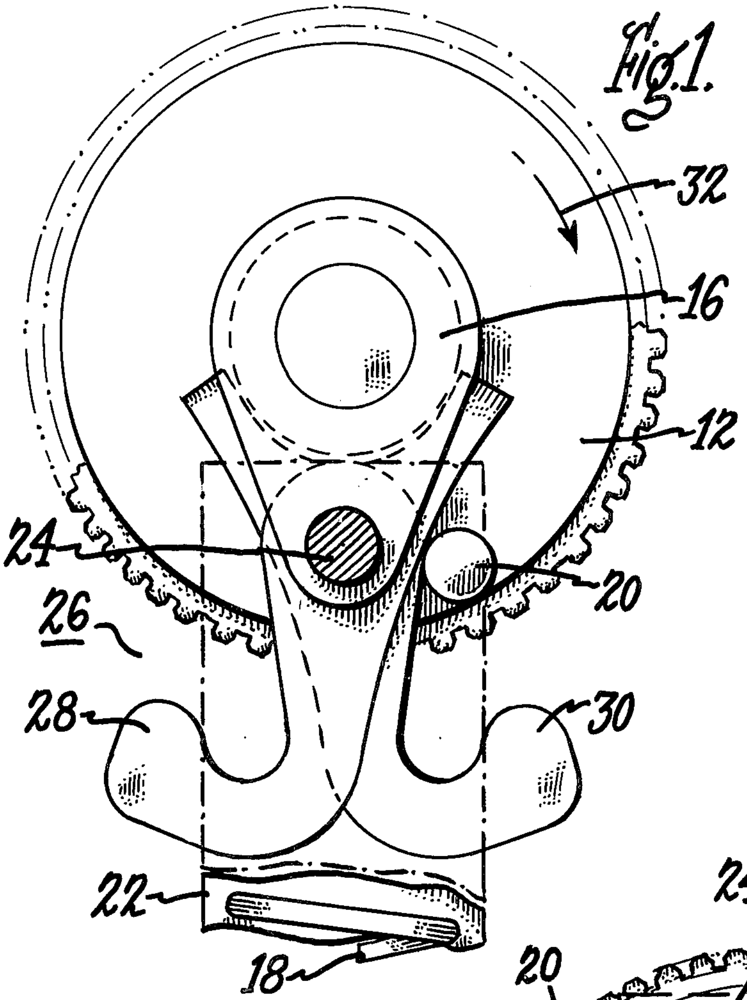
FIG. 1 is a plan view of a driving gear of a spring-driven tap selector showing the protective means of this invention in its present preferred form.

To protect the gear 12 and boss 20 from damage should spring 18 not be able to complete a tap change, the protective means 26 of this invention is provided. As shown in FIG. 1, protective means 26 in its preferred embodiment is in the form of hook cams 28 and 30, mounted on crank 16. As can be seen, especially in FIGS. 1 and 2, the hook cams 28 and 30 are rotatably mounted on crank 16 by means of pin 24. By means of hook cams 28 and 30, the crank 16 can be prevented from damaging boss 20 and gear 12, as will become apparent. As can be seen, the crank 16 is driven by means of gear 12 and the boss 20 to crank or load spring 18. In the present tap changer 10, in the event the tap changer is prevented from making a tap change, after the spring 18 is loaded, the hook cams 28, 30 will prevent the reverse rotation of the crank in a manner that would damage either gear 12 or boss 20.

Figure 2:
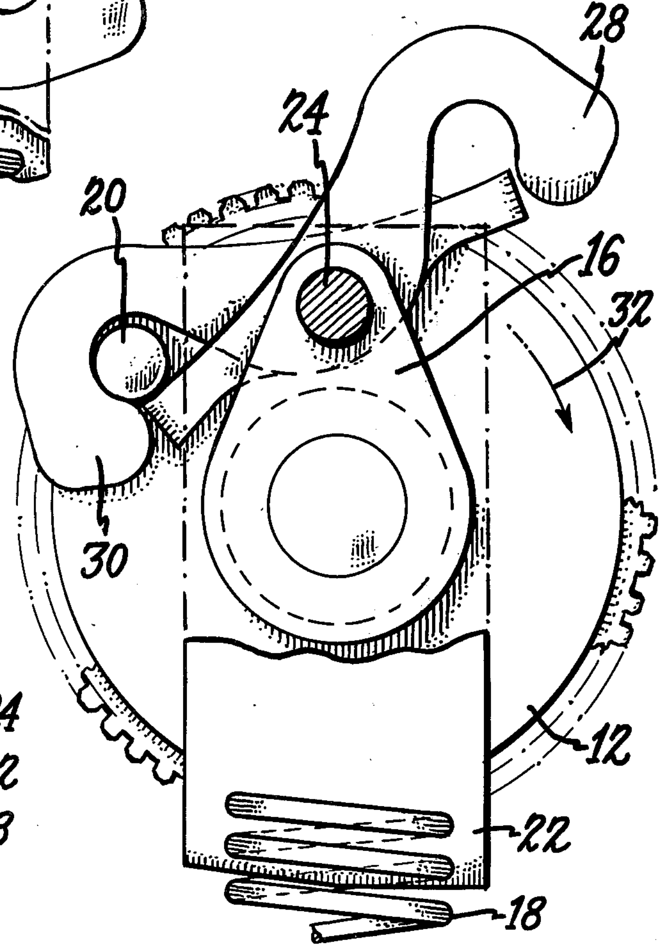
FIG. 2 is a similar view showing the protective means of this invention engaging the boss on the driving gear.

Considering now FIGS. 1 and 2, in FIG. 1 crank 16, bar 22 and spring 18 are in the "ON" or "READY" position, that is, ready for a tap change in either direction. The hook cams 28 and 30 are shown in the "FREE" or "REST" position. Assume a tap change signal, requiring a rotation of gear 12 in a clockwise direction, as shown by arrow 32. As can be seen from FIG. 1, as gear 12 rotates clockwise boss 20 will engage crank 16 rotating it clockwise and loading or cocking spring 18 up to the position as is shown in FIG. 2. Due to the action of boss 20, the hook cams 28 and 30 will move with gear 12 and crank 16, in essentially the position shown in FIG. 1. Should crank 16 reach the position shown in FIG. 2 then continue the clockwise rotation, a tap change would be completed and the tap changer drive returned to the position of FIG. 1.

However, if at the top of the crank stroke, shown in FIG. 2, the tap change signal is removed, the equipment may stall or hang up at essentially the top dead-center position. Vibration, or voltage pulses on the motor, may cause gear 12 and boss 20 to rotate counterclockwise, as indicated by the position of boss 20 in FIG. 2. In prior art devices, the spring 18 could suddenly release, snapping crank 16 into the boss 20, breaking either boss 20 or drive gear 12. As shown in FIG. 2, the protective means 26 in the form of hook cam 28 and 30 prevents damage to either boss 20 or gear 12.

As is shown in FIG. 2, as boss 20 rotates counterclockwise, it rolls on the cam surface of cam 30 causing hook cam 30 to hook the boss 20. At the same time cam 28, through gravity, rotates in the opposite direction about pin 24, as shown. Now should spring 18 suddenly release, cam 30 and 28 would prevent crank 16 from striking boss 20 and breaking it or damaging gear 12. Of course, it will be apparent that the hook cams 28 and 30 work in the same manner when the drive is in the counterclockwise direction.

It will be clear that gear 12 and boss 20 may again be caused to rotate clockwise by a tap change signal. In such event, boss 20 will cam hook cams 28 and 30 into "FREE" position and move crank 16 to perform a tap change. If the signal calls for counterclockwise rotation boss 20, and gear 12 would rotate completely around until boss 20 was in the position shown in FIG. 3, and would then cock or load spring 18 through rotation in the counterclockwise direction.

While there has been shown and described the present preferred embodiment of the invention, it will be understood by those skilled in the tap changer art that various changes may be made in the protective means without departing from the spirit and scope of this invention. Such changes are considered as being in the scope of the invention to the extent that they are described in the appended claims.

What is new and which it is desired to secure by Letters Patent of the United States is:

1. A spring-driven tap changer comprising a driving gear having a boss thereon for driving a crank member to load a spring and including a protective means for preventing damage to said boss and said driving gear, said protective means comprising means pivotally mounted on said crank and actuated by reverse rotation of said boss prior to a tap change to engage said boss and prevent sudden spring action from moving said crank in damaging relation against said boss.

2. A spring-driven tap changer as claimed in claim 1 in which said protective means are in the form of a pair of hooked cams with one of said hooked cams affective to engage said boss in each direction of rotation.

* * * * *